(12) United States Patent
Hachisuka et al.

(10) Patent No.: US 8,085,496 B2
(45) Date of Patent: Dec. 27, 2011

(54) THIN-FILM MAGNETIC HEAD WITH THROUGH HOLES REACHING MEDIUM-OPPOSED SURFACE

(75) Inventors: Nozomu Hachisuka, Tokyo (JP); Naoki Ohta, Tokyo (JP)

(73) Assignee: TDK Corporation, Tokyo (JP)

( * ) Notice: Subject to any disclaimer, the term of this patent is extended or adjusted under 35 U.S.C. 154(b) by 1043 days.

(21) Appl. No.: 11/958,123

(22) Filed: Dec. 17, 2007

(65) Prior Publication Data
US 2009/0154024 A1 Jun. 18, 2009

(51) Int. Cl.
*G11B 5/187* (2006.01)
*G11B 5/60* (2006.01)
*G11B 15/64* (2006.01)
*G11B 17/32* (2006.01)
*G11B 21/21* (2006.01)

(52) U.S. Cl. ........................ 360/122; 360/231
(58) Field of Classification Search .................. 360/231, 360/230, 221, 240, 291, 290, 122
See application file for complete search history.

(56) References Cited

U.S. PATENT DOCUMENTS

| | | | | | |
|---|---|---|---|---|---|
| 2,937,240 | A | * | 5/1960 | Harker | 360/234 |
| 3,148,248 | A | * | 9/1964 | Johnson | 360/230 |
| 3,612,775 | A | * | 10/1971 | Miller | 360/234.6 |
| 3,631,425 | A | * | 12/1971 | Tang | 360/234.6 |
| 3,961,372 | A | * | 6/1976 | Brock et al. | 360/130.24 |
| 4,081,846 | A | * | 3/1978 | Roscamp et al. | 360/236.5 |
| 5,047,888 | A | * | 9/1991 | Mitsuhashi et al. | 360/130.34 |
| 5,276,573 | A | * | 1/1994 | Harada et al. | 360/235.3 |
| 6,344,949 | B1 | * | 2/2002 | Albrecht et al. | 360/236.5 |
| 6,445,541 | B1 | * | 9/2002 | Boutaghou et al. | 360/235.5 |
| 6,985,333 | B1 | * | 1/2006 | Hiller et al. | 360/235.5 |
| 7,394,623 | B2 | * | 7/2008 | Song | 360/235.5 |
| 2004/0240113 | A1 | * | 12/2004 | Johnson et al. | 360/221 |

FOREIGN PATENT DOCUMENTS

| | | | |
|---|---|---|---|
| JP | 01211234 A | * | 8/1989 |
| JP | A-08-212740 | | 8/1996 |
| JP | A-09-198829 | | 7/1997 |
| JP | A-2003-272335 | | 9/2003 |
| JP | A-2004-295951 | | 10/2004 |

* cited by examiner

*Primary Examiner* — Julie Anne Watko
(74) *Attorney, Agent, or Firm* — Oliff & Berridge, PLC

(57) ABSTRACT

Provided is a thin-film magnetic head for reading data from a magnetic recording medium and/or writing data to a magnetic recording medium, in which the magnetic spacing can be controlled appropriately by stably adjusting the pressure working between the thin-film magnetic head and the magnetic recording medium according to the change of conditions such as the change over time. This thin-film magnetic head comprises at least one through hole reaching a surface opposed to the magnetic recording medium of the thin-film magnetic head, for adjusting a pressure working between the thin-film magnetic head and the magnetic recording medium. Preferably, the head further comprises at least one flow-amount control means for controlling the flow amount of gas that flows via the at least one through hole.

16 Claims, 10 Drawing Sheets

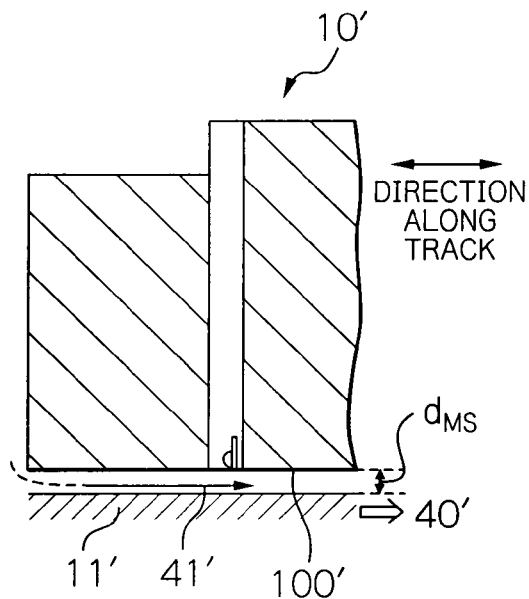
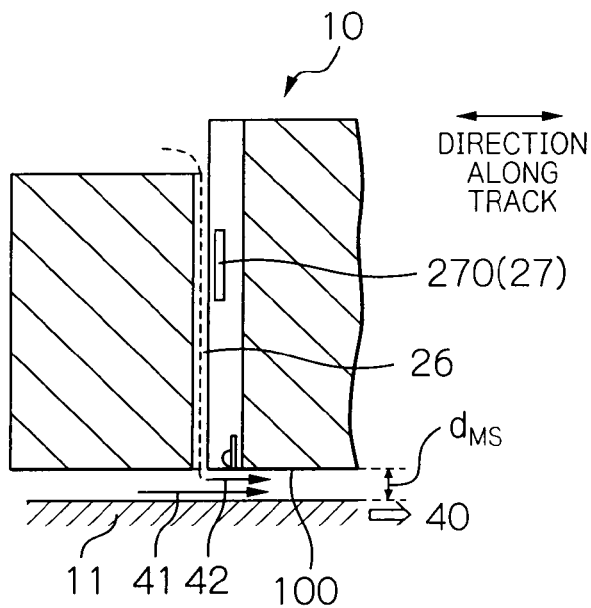
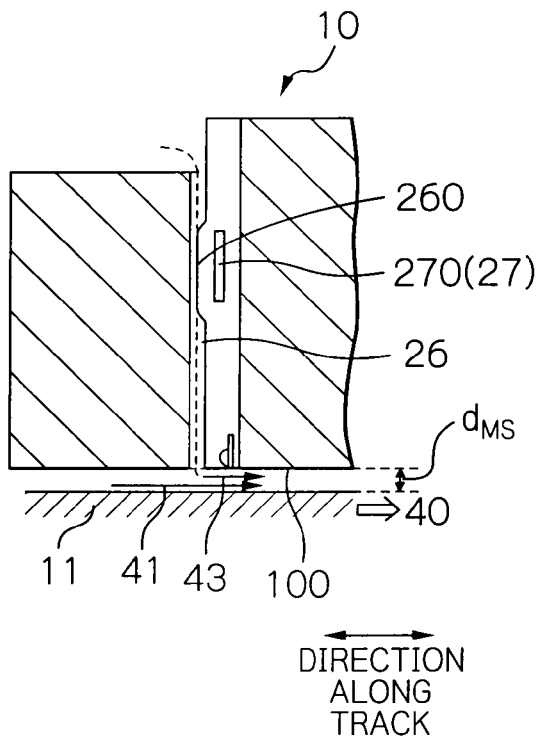
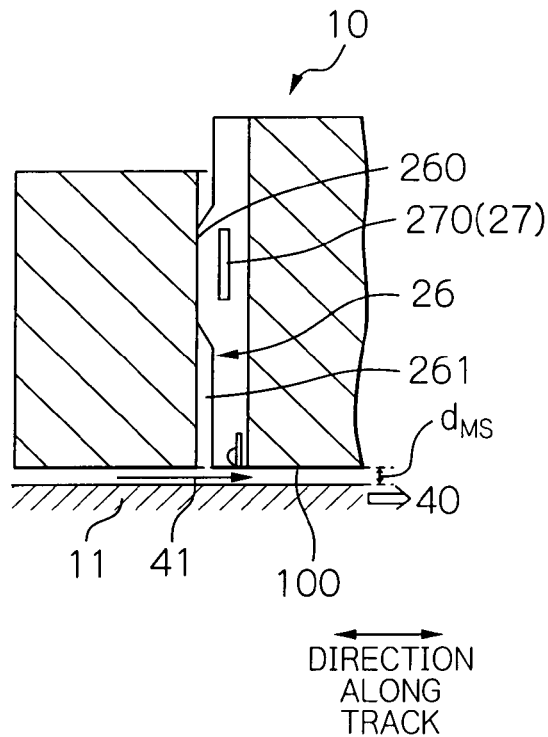

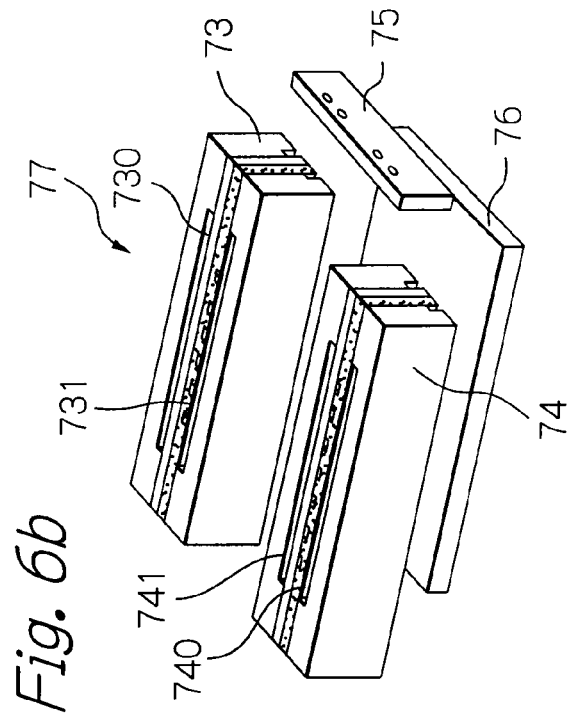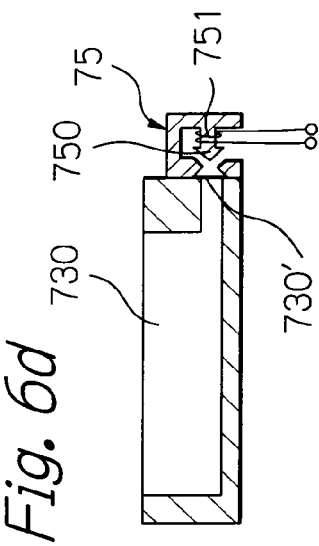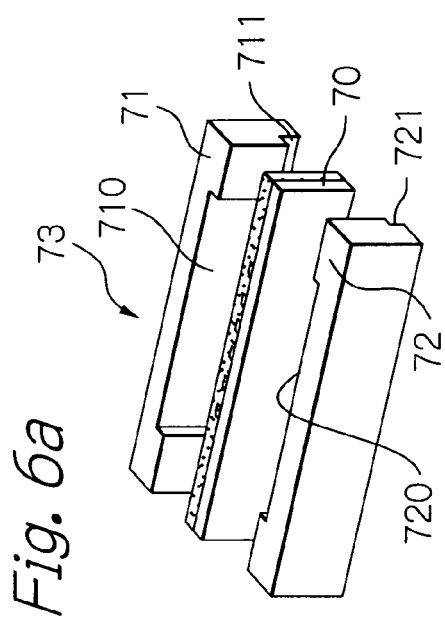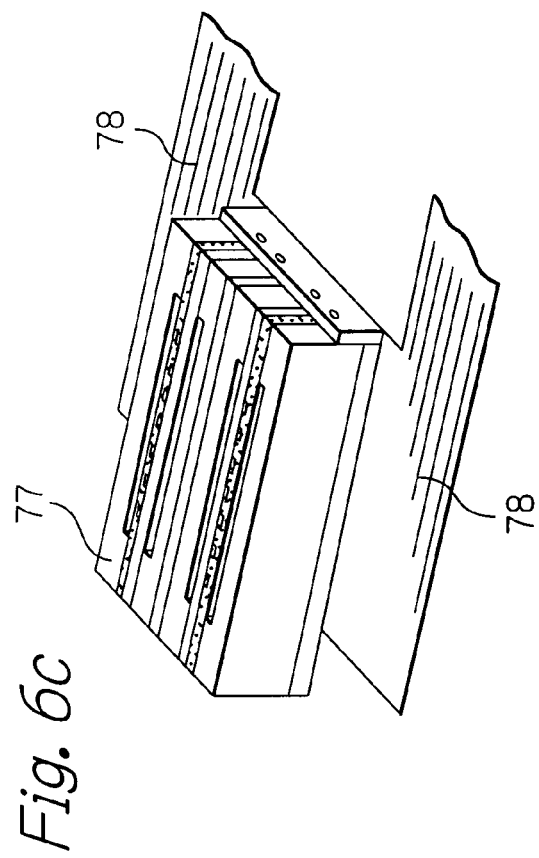
Fig. 6a
Fig. 6b
Fig. 6c
Fig. 6d

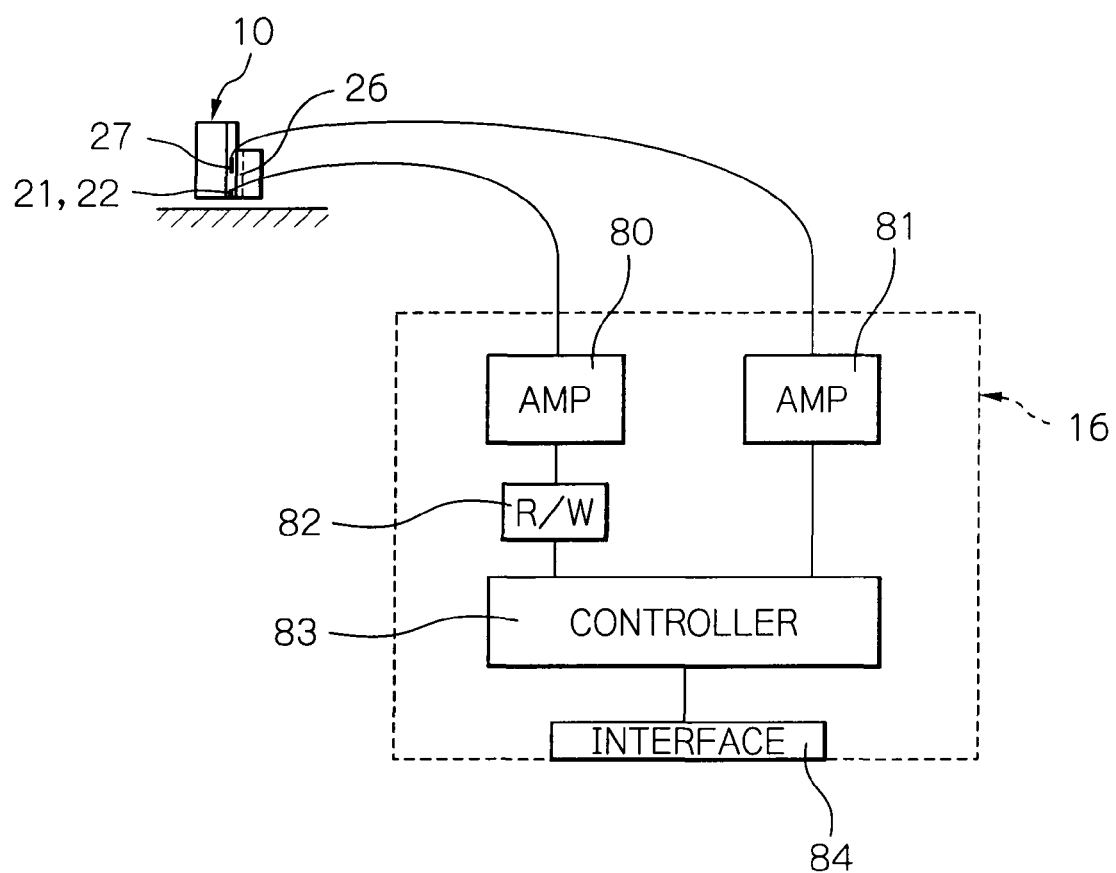

THIN-FILM MAGNETIC HEAD WITH THROUGH HOLES REACHING MEDIUM-OPPOSED SURFACE

BACKGROUND OF THE INVENTION

1. Field of the Invention

The present invention relates to a thin-film magnetic head for applying to magnetic recording, especially to a tape head for reading data from a magnetic tape and writing data to the tape. The present invention further relates to a controlling method of a magnetic spacing that is a distance between the end of the magnetic head element and the surface of the recording layer of the magnetic recording medium.

2. Description of the Related Art

In recent years, magnetic recording and reproducing apparatuses have been remarkably improved in capacity of storage data due to the widespread use of multimedia and the Internet. And magnetic tape apparatuses for backing up or storing data are no exception of this trend of larger capacity, and have been required to be improved in a real recording density corresponding to the larger capacity.

Thin-film magnetic heads are widely used, in the above-described magnetic recording and reproducing apparatuses, for writing data to a magnetic recording medium and reading data from the medium. The thin-film magnetic heads have also been strongly required to be improved in performance corresponding to the larger capacity, especially to appropriately control a magnetic spacing in order to stably perform read and write operations under higher recording density and to maintain original lifetime of the thin-film magnetic head. Here, the magnetic spacing is defined as a distance between the end of the magnetic head element of the thin-film magnetic head and the surface of the recording layer of the magnetic recording medium.

One of the most effective method for controlling the magnetic spacing is to adjust the pressure working between the thin-film magnetic head and the magnetic recording medium. For example, in a magnetic disk apparatus, the thin-film magnetic head flies above the rotating magnetic disk, and thus receives a certain negative pressure (a pressure by which the head and the disk are attracted to each other) generated by laminar air flow between the head and the disk. The negative pressure is balanced with an adjusted pressure which the suspension supporting the head brings to the head, to maintain a predetermined magnetic spacing.

As a measure for positively controlling the magnetic spacing by adjusting the pressure working between the thin-film magnetic head and the magnetic recording medium, for example, Japanese Patent Publication No. 2003-272335A describes a technique in which the head end surface is protruded toward the magnetic disk by heat generated from a heater provided within the thin-film magnetic head for a magnetic disk apparatus. Further, Japanese Patent Publications Nos. 08-212740A and 09-198829A describe techniques for dissolving the adsorption between the head and the magnetic disk.

Also in the thin-film magnetic head for a magnetic tape apparatus (tape head), to adjust the pressure working between the tape head and magnetic tape is an extremely effective method for appropriately controlling the magnetic spacing. Here, the tape head and the magnetic tape as a magnetic recording medium are usually contacted with each other by receiving a certain suppress force which causes them to head toward each other. Therefore, it is important for controlling the magnetic spacing to adjust the suppress force. As an example of intending to adjust the suppress force, Japanese Patent Publication No. 2004-295951A discloses a technique of utilizing a negative-pressure slider.

However, there has been a problem that the magnetic spacing is likely to vary due to the change in pressure working between the thin-film magnetic head and the magnetic recording medium derived from the change in shape of the medium-opposed surface of the head, generated by the contact between the head and the medium.

Especially, the tape head slides on the magnetic tape during read and write operations. Therefore, the shape of the tape bearing surface (TBS), which is a medium-opposed surface as well as a sliding surface, varies over time due to the friction with the magnetic tape. The variation of the shape becomes more rapid when the suppress force working between the tape head and the magnetic tape is set to be larger. Further, the variation becomes more drastic in the case that the magnetic tape contains abrasive. As the case may be, the lifetime of the tape head would be reduced by excessively decreasing the magnetic spacing due to the wear of the head generated from the increase in the degree of contact between the head and the magnetic tape. Further, in some cases, the head performance may be degraded due to frictional heat generated by the contact. Furthermore, in some cases, the magnetic spacing may become larger due to the change in shape of the TBS, which would cause the read output to be decreased, or cause the peak steepness of the read signal to be degraded. Therefore, in the tape head, it is significantly important to control the magnetic spacing appropriately by stably adjusting the pressure working between the head and the magnetic recording medium according to the change of conditions such as the change over time. This adjustment of the pressure also becomes significantly important for other thin-film magnetic heads such as a thin-film magnetic head for magnetic disk.

BRIEF SUMMARY OF THE INVENTION

Therefore, an object of the present invention is to provide a thin-film magnetic head in which the magnetic spacing can be controlled appropriately by stably adjusting the pressure working between the thin-film magnetic head and the magnetic recording medium according to the change of conditions such as the change over time, and a magnetic tape apparatus provided with the just-described thin-film magnetic head.

Another object of the present invention is to provide a method for controlling the magnetic spacing appropriately by stably adjusting the pressure working between the thin-film magnetic head and the magnetic recording medium according to the change of conditions such as the change over time.

Before describing the present invention, terms used herein will be defined. In a multilayer structure of element(s) formed on/above an element formation surface of the substrate in a thin-film magnetic head, a layer located on the substrate side in relation to a standard layer is referred to as being located "lower" than, "beneath" or "below" the standard layer, and a portion on the substrate side of a layer is referred to as a "lower" portion. Further, a layer located on the stacking direction side (the opposite side to the substrate) in relation to a standard layer is referred to as being located "upper" than, "on" or "above" the standard layer, and a portion on the stacking direction side of a layer is referred to as an "upper" portion.

According to the present invention, a thin-film magnetic head is provided, which comprises at least one through hole reaching a surface opposed to the magnetic recording medium of the thin-film magnetic head, for adjusting a pressure working between the thin-film magnetic head and the magnetic recording medium.

In this thin film magnetic head with the through hole, gas (air) in the through hole is dragged out into between the head and the magnetic recording medium based on Venturi effect when the medium moves. As a result, the laminar air flow generated between the head and the moving medium can be adjusted; and thus, the pressure between the head and the medium can be stably controlled. Here, the degree of the pressure can be determined by appropriately setting the number of the through holes and the shape and cross-sectional area of each of through holes.

The thin-film magnetic head according to the present invention preferably further comprises at least one flow-amount control means for controlling the flow amount of gas that flows via the at least one through hole. The flow-amount control means acts as a valve by which varied is the cross-sectional area of at least a portion of the through hole, or a valve that opens and closes the opening or the coupling end of the through hole. As a result, the laminar air flow generated between the thin-film magnetic head and the magnetic recording medium can be controlled; and thus, the pressure working between the head and the medium can be dynamically adjusted according to the change of conditions such as the change over time. Consequently, the magnetic spacing can be stably controlled; read and write operations can be stably performed under higher recording density; and the excessive wear of the head can be avoided.

Further, the thin-film magnetic head according to the present invention preferably comprises: at least one magnetic head element for reading and/or writing data, formed on/above an element formation surface of a substrate; an overcoat layer formed on the element formation surface so as to cover the at least one magnetic head element; and a closure adhered to at least a portion of an upper surface of the overcoat layer, the at least one through hole reaching a sliding surface opposed to the magnetic recording medium of the thin-film magnetic head. Here, this head preferably further comprises at least one flow-amount control means for controlling the flow amount of gas that flows via the at least one through hole.

In the thin-film magnetic head with the flow-amount control means and the through hole extending to the sliding surface, the at least one flow-amount control means is preferably at least one heating means; in this case, it is also preferable that two heating means are provided in such a way as to sandwich the through hole therebetween. Alternatively, the at least one flow-amount control means is preferably at least one piezoelectric element.

Further, in the thin-film magnetic head with the flow-amount control means and the through hole extending to the sliding surface, the at least one through hole is preferably provided on a boundary of the overcoat layer and the closure. And it is also preferable that an added closure is adhered on a surface opposite to the element formation surface of the substrate, and the at least one through hole is provided on a boundary of the added closure and the substrate.

Furthermore, the thin-film magnetic head according to the present invention preferably comprises: at least one magnetic head element for reading and/or writing data, formed on/above an element formation surface of a substrate; an overcoat layer formed on the element formation surface so as to cover the at least one magnetic head element; a closure adhered to at least a portion of an upper surface of the overcoat layer; an added closure adhered on a surface opposite to the element formation surface of the substrate; a frame adhered to surfaces opposite to a sliding surface of the substrate, the closure and the added closure; at least one through hole provided on a boundary of the overcoat layer and the closure; and at least one added through hole provided on a boundary of the added closure and the substrate, the at least one flow-amount control means provided in positions of: an opening of the at least one through hole formed between the overcoat layer or the closure and the frame; and an opening of the at least one added through hole formed between the added closure or the substrate and the frame.

In the just-described magnetic head, the flow-amount control means can independently control each of the amounts of gas (air) flowing via the through hole(s) and the added through hole(s). Therefore, the balance of distribution in the pressure working between the head and the medium can be dynamically adjusted.

According to the present invention, a magnetic tape apparatus is further provided, which comprises: at least one magnetic tape; at least two reels for feeding and/or winding the at least one magnetic tape; at least one thin-film magnetic head described above, for reading data from the at least one magnetic tape and/or writing data to the at least one magnetic tape; and a recording and/or reproducing control circuit for controlling read and/or write operation performed by the at least one thin-film magnetic head, and the magnetic tape apparatus further comprises a pressure control circuit for controlling operations of the at least one flow-amount control means.

According to the present invention, a controlling method of a magnetic spacing is further provided, which comprises the step of adjusting a pressure working between a thin-film magnetic head and a magnetic recording medium by controlling the flow amount of gas flowing via at least one through hole that is provided in the thin-film magnetic head and reaches a surface opposed to the magnetic recording medium. By using this controlling method, the pressure working between the head and the medium can be adjusted dynamically and stably. In this controlling method, at least one heating means or at least one piezoelectric element is preferably used for controlling the flow amount of gas flowing via the at least one through hole.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE SEVERAL VIEWS OF THE DRAWINGS

FIGS. 4a to 4d show cross-sectional views taken along plane A shown in FIG. 1b, explaining the principle for adjusting the pressure working between the head and the medium by using the through holes and the heating element according to the present invention;

FIGS. 6a to 6c show perspective views schematically illustrating a further embodiment of the thin-film magnetic head according to the present invention;

FIG. 6d shows a schematic view explaining the operation of adjusting the pressure working between the head and the medium in the embodiment shown in FIGS. 6a to 6c;

FIG. 7 shows a block diagram schematically illustrating a configuration of the recording/reproducing and pressure control circuit provided in the magnetic tape apparatus according to the present invention.

DETAILED DESCRIPTION OF THE INVENTION

Figure 1A:
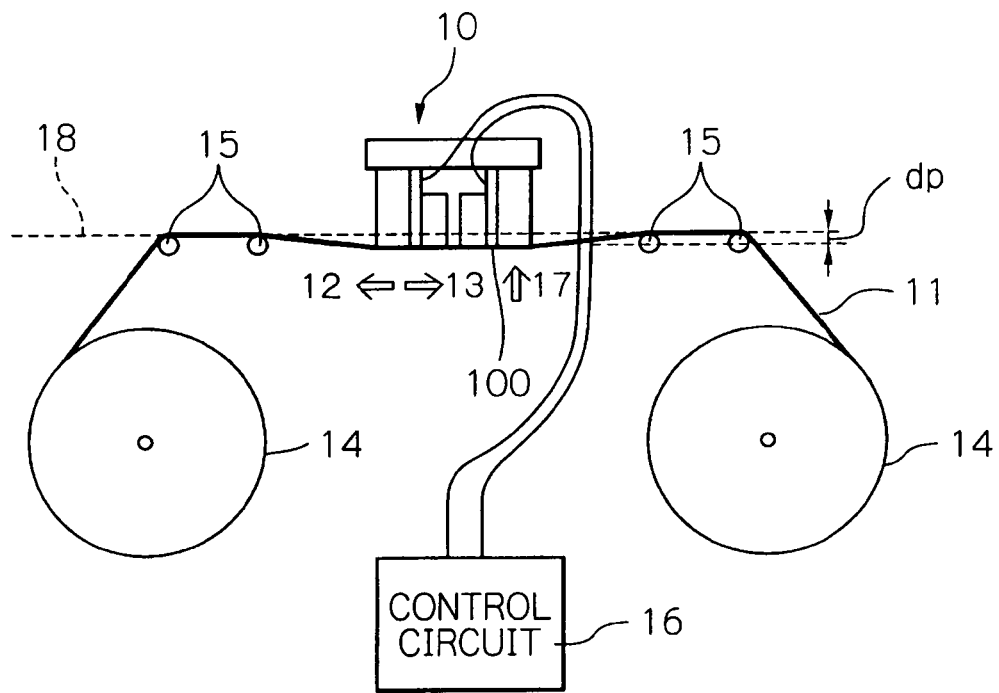
FIG. 1a shows a schematic view illustrating the main part of one embodiment of the magnetic tape apparatus according to the present invention.
Figure 1B:
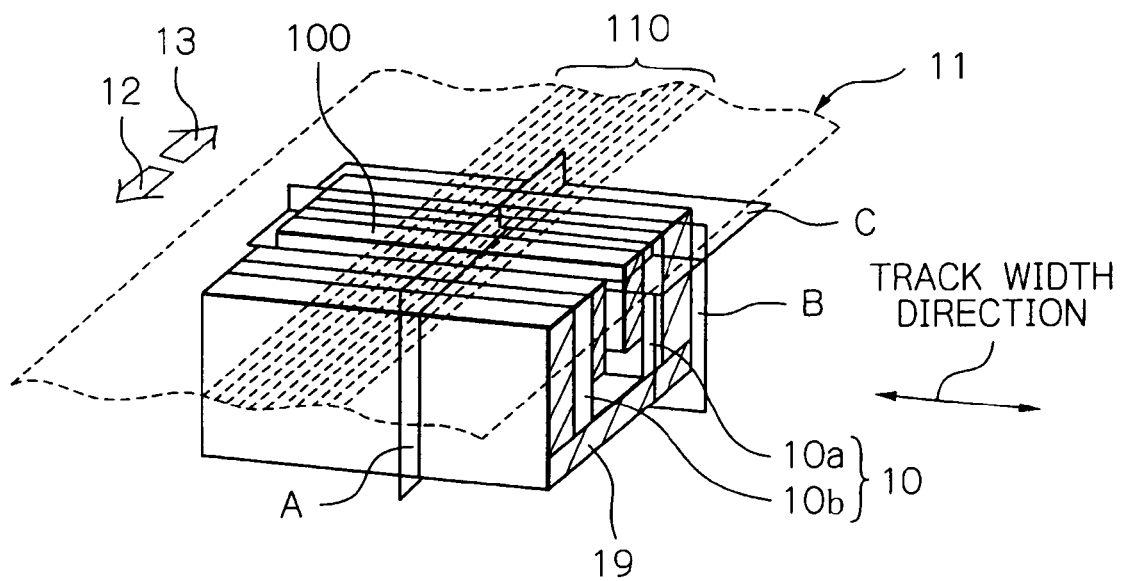
FIG. 1b shows a perspective view schematically illustrating one mode of the configuration of the magnetic recording medium and the thin-film magnetic head according to the present invention.

FIG. 1a shows a schematic view illustrating the main part of one embodiment of the magnetic tape apparatus according to the present invention. And FIG. 1b shows a perspective view schematically illustrating one mode of the configuration of the magnetic recording medium and the thin-film magnetic head according to the present invention.

As shown in FIG. 1a, the magnetic tape apparatus of the present embodiment includes: a magnetic tape 11 as a magnetic recording medium; a tape head 10 as a thin-film magnetic head for performing read and write operations to the magnetic tape 11; reels 14 for winding and unwinding (feeding) the magnetic tape 11; guide pins 15 for guiding the running of the magnetic tape 11; and a recording/reproducing and pressure control circuit 16.

The tape head 10 is provided for reading and writing data signals, whose tape baring surface (TBS) 100, which is the end surface on the magnetic tape 11 side or a medium-opposed surface (opposed-to-medium surface), is contacted with the magnetic tape 11 running in the direction of arrow 12 or 13. That is, the TBS 100 of the tape head 10 acts as a sliding surface.

The tape head 10 and the guide pins 15 are positioned so that a predetermined suppress force 17 works to cause the tape head 10 and magnetic tape 11 to head toward each other. The suppress force 17 can be adjusted by the distance (penetration) $d_P$ by which the tape head 10 is held down from the common tangent line 18 drawn on the tape-contact sides of the guide pins 15. As described in detail later, the tape head 10 includes through holes (through-type slots, penetrating holes) and a flow-amount control means for controlling the flow amount of gas (air) that flows via the through holes, which enable the whole pressure working between the tape head 10 and the magnetic tape 11, including the suppress force 17, to be adjusted.

The recording/reproducing and pressure control circuit 16 is provided for controlling the read and/or write operations of the tape head 10, and further controlling operations of the flow-amount control means.

As shown in FIG. 1b, the magnetic tape 11 has a plurality of tracks 110. The tape head 10 includes the first head part 10a and the second head part 10b, and a frame 19 that supports both of the head parts. During read and write operations, the magnetic tape 11 runs in the direction of the arrow 12 or 13. The tape head 10 performs data-reading and data-writing operations to the tracks 110 of the magnetic tape 11, the TBS 100 of the head 10 being contacted with the running tape 11. In the case that the magnetic tape runs in the direction of arrow 12, for example, the first head part 10a on the trailing side may write and the second head part 10b on the leading side may read. Whereas, in the case of the tape run in the direction of arrow 13, the head parts may be counterchanged with respect to their read and write operations. As a matter of course, a configuration in which the tape head 10 includes either of the first head part 10a or the second head part 10b is also within the scope of the present invention.

Figure 2:
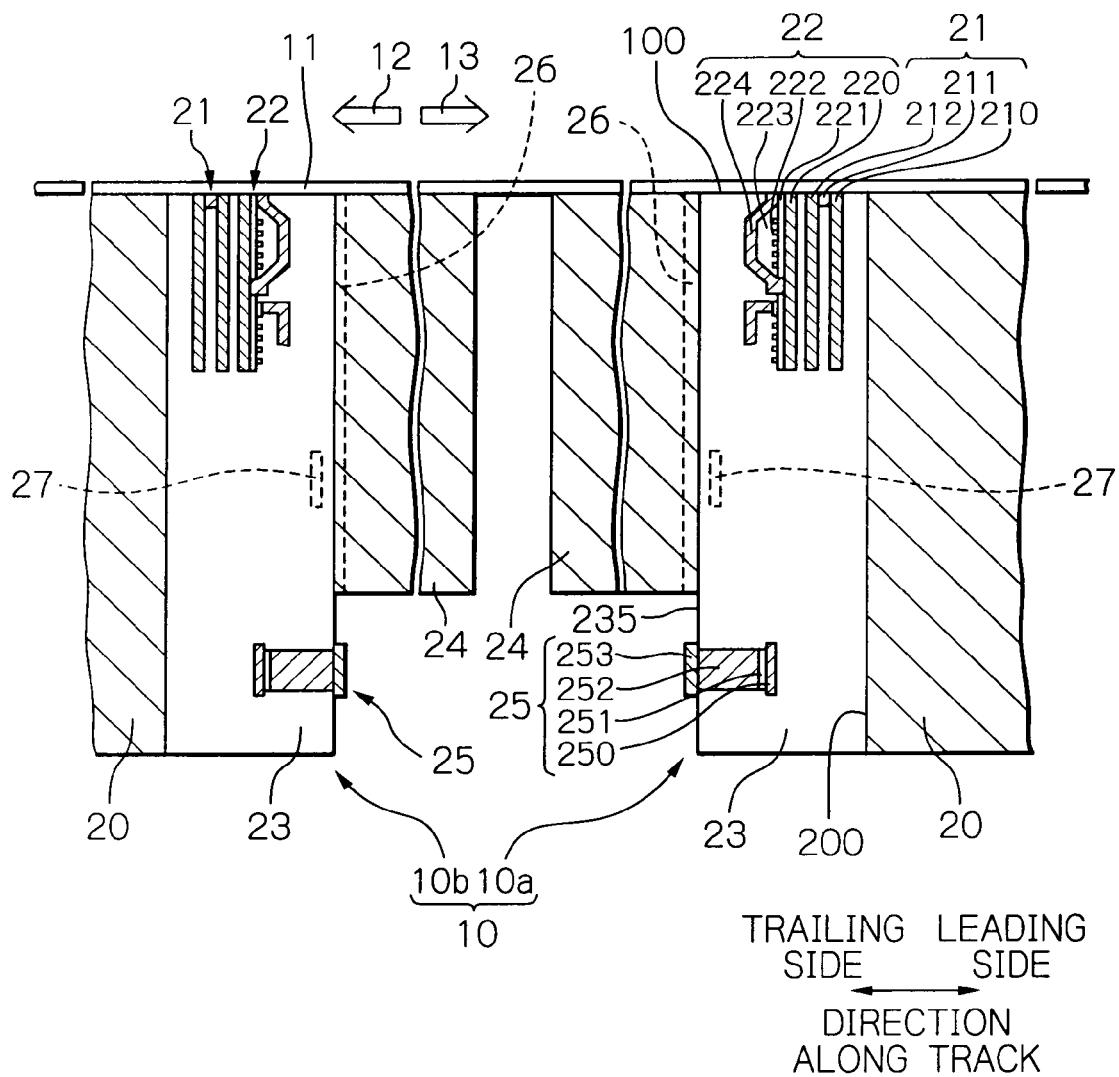
FIG. 2 shows a cross-sectional view taken along plane A shown in FIG. 1b, illustrating a main portion of one embodiment of the thin-film magnetic head according to the present invention.

FIG. 2 shows a cross-sectional view taken along plane A shown in FIG. 1b, illustrating a main portion of one embodiment of the thin-film magnetic head according to the present invention. In FIG. 2, a terminal electrode 25 may not practically appear on the cross-section taken along the plane A, however, is presented on the cross-section for convenience of explanation. Further, the first and second head parts 10a and 10b of the tape head 10 are opposed with each other in the direction along track, and have the common structure corresponding to each other. Therefore, only the first head part 10a will be explained below.

As shown in FIG. 2, the first head part 10a of the tape head 10 includes: a head substrate 20 made of, for example, AlTiC ($Al_2O_3$—TiC), having an element formation surface 200 perpendicular to the TBS 100; a magnetoresistive (MR) element 21 as a read head element for reading data signals, formed on/above the element formation surface 200; an electromagnetic transducer 22 as a write head element for writing data signals, formed directly above the MR element 21; an overcoat layer 23 formed on the element formation surface 200 so as to cover the MR element 21 and the electromagnetic transducer 22; a closure 24 made of, for example, AlTiC ($Al_2O_3$—TiC), adhered to a portion of the upper surface 235 of the overcoat layer 23, the other portion of the upper surface 235 being exposed; through holes (penetrating holes) 26 for adjusting the pressure working between the tape head 10 and the magnetic tape 11; an heating element 27 as a flow-amount control means for controlling the flow amount of gas (air) that flows via the through holes 26; and a plurality of terminal electrodes 25 formed in the exposed portion of the upper surface 235 of the overcoat layer 23.

Figure 3A:
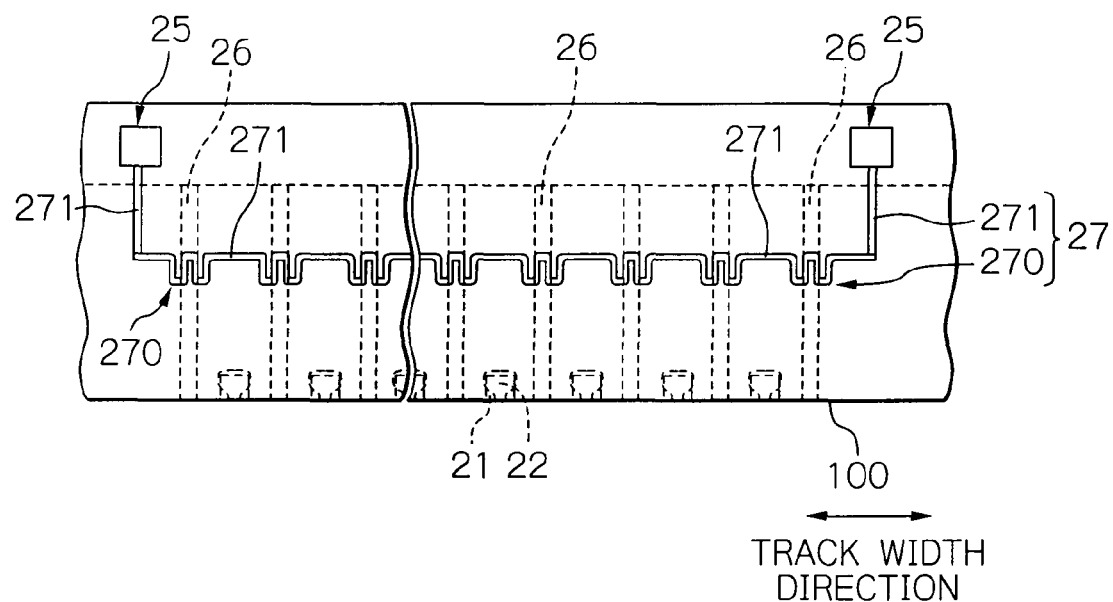
FIG. 3a shows a cross-sectional view taken along plane B shown in FIG. 1b, illustrating a main portion of one embodiment of the thin-film magnetic head according to the present invention.
Figure 3B:
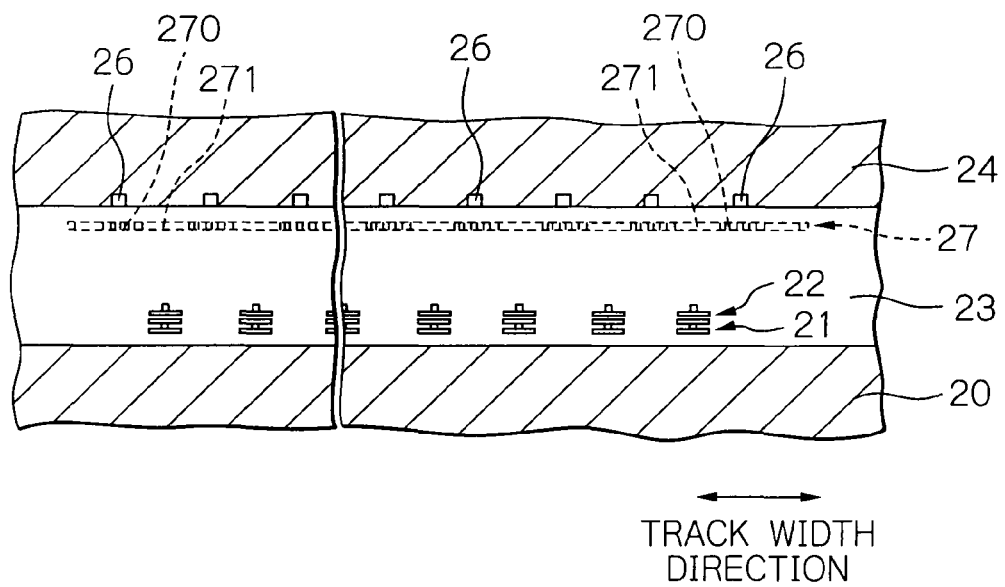
FIG. 3b shows a cross-sectional view taken along plane C shown in FIG. 1b, illustrating a main portion of one embodiment of the thin-film magnetic head according to the present-invention.

In the present embodiment, provided in the element formation surface are: a plurality of MR elements 21 and a plurality of electromagnetic transducers 22, both of which are aligned in the track width direction corresponding to a plurality of tracks 110; and further a plurality of through holes 26 (FIGS. 3a and 3b). However, in FIG. 2, only ones of the elements 21 and 22 and holes 26 are presented on the cross-section taken along the plane A of FIG. 1b.

The MR elements 21 and electromagnetic transducers 22 are electrically connected to their respective terminal electrodes 25. One ends of the MR elements 21 and electromagnetic transducers 22 reach the TBS 100 and contact with the magnetic tape 11. In the just-described configuration, during read and write operations, each of the electromagnetic transducers 22 writes data signals by applying signal magnetic fields to the corresponding track of the running magnetic tape 10, and each of the MR elements 21 reads data signals by sensing signal magnetic fields from the corresponding track of the running magnetic tape 10.

As shown in FIG. 2, each of the MR elements 21 includes: an MR multilayer 211; and a lower shield layer 210 and an upper shield layer 212, disposed so as to sandwich the MR multilayer therebetween. The upper and lower shield layers 212 and 210 act for preventing the MR multilayer 211 from receiving an external magnetic field as a noise. Each of the upper and lower shield layers 212 and 210 is a magnetic layer formed of, for example, FeSiAl (Sendust), NiFe (Permalloy), CoFeNi, CoFe, FeN, FeZrN or CoZrTaCr, or a multilayer of these materials with thickness of approximately 0.5 to 3 µm (micrometers), made by using, for example, a frame plating method or a sputtering method.

The MR multilayer 211 is a magneto-sensitive portion for sensing signal magnetic fields by utilizing an MR effect, and may be, for example, an anisotropic magnetoresistive (AMR) multilayer that utilizes an AMR effect, a giant magnetoresistive (GMR) multilayer that utilizes a GMR effect, or a tunnel magnetoresistive (TMR) multilayer that utilizes a TMR effect. Further, in the case of the GMR multilayer, the MR multilayer 211 may be a current-in-plane giant magnetoresistive (CIP-GMR) multilayer, or a current-perpendicular-to-plane giant magnetoresistive (CPP-GMR) multilayer. Any MR multilayer 211 utilizing one of these MR effects senses signal magnetic fields from the track 110 of the magnetic tape 11 with high sensitivity. In the case that the MR multilayer 211 is a CPP-GMR multilayer or a TMR multilayer, the upper and lower shield layers 212 and 210 also act as electrodes. Whereas, in the case that the MR multilayer 211 is an AMR multilayer or a CIP-GMR multilayer, insulating layers are provided between the MR multilayer 211 and respective upper and lower shield layers 212 and 210, and further, MR lead layers are provided to be electrically connected with the MR multilayer 211.

As shown in FIG. 2, each of the electromagnetic transducers 22 includes: a lower magnetic pole layer 220; an upper magnetic pole layer 224; a write gap layer 221, the end portion on the TBS 100 side of the write gap layer 221 being sandwiched between the lower magnetic pole layer 220 and the upper magnetic pole layer 224; a write coil layer 222 formed so as to pass through in every turn at least between the upper and lower magnetic pole layers 224 and 220; and a coil insulating layer 223 for isolating the write coil layer 222 from the upper and lower magnetic pole layers 224 and 220.

The lower magnetic pole layer 220 and the upper magnetic pole layer 224 act as a path of the magnetic flux excited by write current flowing through the write coil layer 222. And one end portions of the upper and lower magnetic pole layers 224 and 220 sandwich the end portion on the TBS 100 side of the write gap layer 221. The leakage magnetic field from the sandwiched end portion of the write gap layer 221 is used for writing. In FIG. 2, the write coil layer 222 has a monolayer structure, however, may have a two or more layered structure or a helical coil shape. Further, the upper shield layer 212 and the lower magnetic pole layer 220 may be substituted with one magnetic layer.

The lower magnetic pole layer 220 is a soft-magnetic layer formed of, for example, NiFe (Permalloy), CoFeNi, CoFe, FeN FeZrN or CoZrTaCr, or a multilayer of these materials with thickness of approximately 0.5 to 3 µm, made by using, for example, a frame plating method or a sputtering method. The write gap layer 221 is a non-magnetic layer formed of, for example, $Al_2O_3$ (alumina), $SiO_2$ (silicon dioxide), AlN (aluminum nitride) or DLC (diamond-like carbon) with thickness of approximately 0.01 to 0.05 µm, made by using, for example, a sputtering method or a chemical vapor deposition (CVD) method. The write coil layer 222 is a conductive layer formed of, for example, Cu with thickness of approximately 0.5 to 5 µm, made by using, for example, a frame plating method or a sputtering method. The coil insulating layer 223 is, for example, an insulating resin layer formed of, for example, a heat-cured photoresist such as novolac based with thickness of approximately 0.7 to 7 µm, made by using, for example, a photolithography method. The upper magnetic pole layer 224 is a magnetic layer formed of, for example, NiFe (Permalloy), CoFeNi, CoFe, FeN FeZrN or CoZrTaCr, or a multilayer of these materials with thickness of approximately 0.5 to 3 µm, made by using, for example, a frame plating method or a sputtering method. The overcoat layer 23 is formed of, for example, stacked non-magnetic insulating materials such as $Al_2O_3$ (alumina), $SiO_2$ (silicon dioxide), AlN (aluminum nitride) or DLC, made by using, for example, a sputtering method or a CVD method.

The through holes (penetrating holes) 26 are provided for adjusting the whole pressure, which includes the suppress force, working between the tape head 10 and the magnetic tape 11. One end of each of the through holes 26 reaches (extends to) the TBS 100, and the other end reaches the head end surface on the opposite side to the TBS 100. In the present embodiment, the through holes 26 are made of a plurality of grooves formed on the surface of the closure 24 which is to be adhered to the upper surface 235, and are aligned in the track width direction (FIGS. 3a and 3b); however, in FIG. 2, only one of the holes 26 is presented on the cross-section taken along the plane A in FIG. 1b. As described in detail later by referring to FIGS. 4a to 4d, the through holes 26 enables the magnetic spacing to be stably controlled by adjusting the pressure working between the first head part 10a and the magnetic tape 11.

The heating element 27 is a flow-amount control means for controlling the flow amount of gas (air) that flows via the through holes 26. As detailed later by referring to FIGS. 4a to 4d, the heating element 27 acts as a valve by which varied is the cross-sectional area of at least a portion of the through holes 26. As a result, the heating element 27 can control the laminar air flow which passes between the TBS 100 of the tape head 10 and the surface of the magnetic tape 11, and thus enables the pressure working between the first head part 10a and the magnetic tape 11 to be dynamically adjusted according to the change of conditions such as the change over time. Consequently, the magnetic spacing can be stably controlled, and the excessive wear of the head can be avoided. The heating element 27 may be provided in a position sufficiently distant from the TBS 100, in the case that it is required to avoid the protrusion toward the magnetic tape 11 of the ends on the TBS 100 side of the MR elements 21 and the electromagnetic transducers 22, due to the change in shape of the TBS 100 by the heat generated from the heating element 27.

Further, the through holes 26 and the heating element 27 are provided also in the second head part 10b as well as the first head part 10a, and also enable the pressure working between the second head part 10b and the magnetic tape 11 to be dynamically adjusted independently from the first head part 10a. Therefore, in either case that the magnetic tape 11 runs in the direction of arrow 12 or 13, in each of the first and second head parts 10a and 10b, an appropriate magnetic spacing can be maintained under the proper pressure, and thus, the favorable read and write operations can be performed.

The terminal electrode 25 includes a lead electrode 250, a base electrode film 251, a bump 252 and a pad 253. The lead electrode 250 is electrically connected with a lead line extending from the MR element 21, the electromagnetic transducer 22 or the heating element 27. On the lead electrode 250, formed is the base electrode film 251 with conductivity, and the bump 252 is formed by using a plating method with the base electrode film 251 as an electrode. The base electrode film 251 and the bump 252 are formed of a conductive material such as Cu. The base electrode film 251 has a thickness of, for example, approximately 10 to 200 nm (nanometers), and the bump 252 has a thickness of, for example, approximately 5 to 30 μm. The top end of the bump 252 is exposed in the upper surface 235 of the overcoat layer 23. And on the top end of the bump, formed is the pad 253.

FIG. 3a shows a cross-sectional view taken along plane B shown in FIG. 1b, illustrating a main portion of one embodiment of the thin-film magnetic head according to the present invention. In FIG. 3a, the heating element 27 appears on the cross-section, and the MR elements 21, the electromagnetic transducers 22 and the through holes 26 are presented by dashed lines. FIG. 3b shows a cross-sectional view taken along plane C shown in FIG. 1b, illustrating a main portion of one embodiment of the thin-film magnetic head according to the present invention. In FIG. 3b, the heating element 27 is presented by dashed lines.

As shown in FIG. 3a, the MR elements 21 and the electromagnetic transducers 22 are aligned in the track width direction respectively, one ends of which reach the TBS 100. A plurality of through holes 26, one ends of which also reach the TBS 100, is provided in positions between the adjacent MR elements 21 (adjacent electromagnetic transducers 22) and in positions which sandwich the whole MR elements 21 (the whole electromagnetic transducers 22) aligned in the track width direction therebetween. However, the positions of the through holes 26 are not limited to the above; they can be determined in consideration of the balance of the pressure working between the tape head 10 and the magnetic tape 11. In the present embodiment, the cross-section of the through hole 26 has a shape of quadrangle and an edge with the length of, for example, approximately 0.1 to 3000 μm. Further, the length in the direction perpendicular to the TBS 100 of the through hole 26 is, for example, approximately 1 to 10 mm. However, the shape of the cross-section of the through hole 26 is not limited to quadrangular, and may be, for example, circular, elliptical, triangular or trapezoidal.

Further, as shown in FIG. 3b, the through holes 26 are provided on the boundary of the closure 24 and the overcoat layer 23, and specifically, are made of a plurality of grooves formed on the surface of the closure 24 which is to be adhered to the upper surface 235 of the overcoat layer 23. In the case, the through holes 26 can be formed with comparative ease in the manufacturing process of the head, by forming these grooves on the closure 24 in advance, and then bonding the closure 24 on the upper surface 235 of the overcoat layer 23.

Being back to FIG. 3a, the heating element 27 is a conductive path pattern extending in the track width direction with a predetermined length, and has heating portions 270 and lead portions 271. The heating portion 270 is a meander pattern of electric resistor material, located just below the through hole 26 (as shown in FIG. 3b). The lead portion 271 is a conductive pattern electrically, connecting the adjacent heating portions 270 and further connecting the heating portion 270 and the terminal electrode 25. The heating element 27 generates heat by being supplied with electric power through the terminal electrodes 25 from the recording/reproducing and pressure control circuit 16 (FIG. 1a). The surrounding of the portion of the through hole 26, positioned above the heating portion 270, are thermally expanded by the heat from the heating portion 270, and then, the cross-sectional area of the portion of the through hole 26 is decreased. Thus, the cross-sectional area, which is an area of the cross-section perpendicular to the extending direction of the through hole 26, can be controlled by adjusting the amount of supplied electric power to the heating element 27.

The shape of the heating portion 270 is not limited to the meander one, and may be, for example, one line, a U-shape or spiral. Further, lead portions that extend to the terminal electrodes may be provided at both end portions of each of the heating portions 270 so that the heating operation of each of the heating portions 270 can be controlled independently. The heating portion 270 has a line width of, for example, approximately 1 to 100 μm and a thickness of, for example, approximately 0.01 to 5 μm; and is formed of a material mainly including, for example, NiCu, NiCr, Ta, W, Ti, Cu, Au, Al or NiFe. The lead portion 271 may be formed of a conductive material such as Cu or Au, or may be formed integrally with the heating portion 270 by using the same material as the portion 270.

FIGS. 4a to 4d show cross-sectional views taken along plane A shown in FIG. 1b, explaining the principle for adjusting the pressure working between the head and the medium by using the through holes 26 and the heating element 27 according to the present invention.

FIG. 4a shows the case of a tape head 10' having no through holes and heating elements. As shown in the figure, when a magnetic tape 11' runs in the direction of arrow 40', a high-speed laminar air flow 41' is generated due to dragging of the air by the running magnetic tape 11', between the TBS 100' of the tape head 10' and the surface of the magnetic tape 11'. As a result, a space comes into being therebetween. The space becomes very small due to the low pressure generated correspondingly from the high-speed laminar air flow 41' based on Bernoulli's theorem. The reason why the suppress force is applied between the tape head 10' and the magnetic tape 11' is to contact the tape head 10' with the magnetic tape 11' by pressing the very small space. Next, explained will be the case of a head provided with the through holes 26 and the heating element 27.

As shown in FIG. 4b, the heating element 27 of the tape head 10 does not receive electric power, and the cross-sectional area of the through hole 26 keeps its original amount throughout the hole. In this case, when the magnetic tape 11 runs in the direction of arrow 40, a high-speed laminar air flow 41 is generated, as is the case of FIG. 4a, between the TBS 100 of the tape head 10 and the surface of the magnetic tape 11. Here, the through hole 26 reaches the TBS 100; therefore, a laminar air flow 42 is further generated due to dragging-out of the gas (air) in the through hole 26 by the laminar air flow 41 based on Venturi effect. As a result, the space between the head and the tape becomes larger, compared to the case of FIG. 4a. That is, by providing the through hole 26, generated is the (positive) pressure that works to pull the tape head 10 and the magnetic tape 11 away from each other. The degree of the positive pressure depends on the composition, pressure and temperature of the atmosphere (air); however, it can be controlled by adjusting the number of the through holes 26 and the shape and cross-sectional area of each of the holes 26.

Next, as shown in FIG. 4c, the heating element 27 of the tape head 10 is supplied with electric power, and then, the surrounding of the portion 260 of the through hole 26, positioned above the heating portion 270, are thermally expanded by the heat from the heating portion 270. Thus, the cross-sectional area of the portion 260 is decreased. In this case, the amount of laminar air flow 43, which is generated by being dragged with the laminar air flow 41 and passes via the through hole 26, becomes smaller than the amount of laminar air flow 42 shown in FIG. 4b, because of the increase in fluid resistance of the through hole due to the decrease in the cross-sectional area. As a result, the positive pressure generated by the through hole 26 becomes smaller than that in FIG. 4b. Thus, the degree of the positive pressure can be controlled by adjusting the amount of electric power supplied to the heating element. Consequently, the magnetic spacing $d_{MS}$ can be stably controlled as needed by adjusting the total pressure, including the suppress force, working between the tape head 10 and the magnetic tape 11, according to the change of conditions such as the change over time. Here, a magnetic spacing $d_{MS}$ is defined as a distance between the ends of the MR element and electromagnetic transducer of the thin-film magnetic head and the surface of the recording layer of the magnetic recording medium.

When the heating element 27 receives more electric power, as shown in FIG. 4d, the portion 260 of the through hole 26, positioned above the heating portion 270, is almost closed due to the larger thermal expansion. As a result, the through hole 26 is separated into two parts, one of which becomes a cavity 261 with one end reaching the TBS 100. The cavity 261 could generate, depending on its shape, a (negative) pressure that works to attract the tape head 10 and the magnetic tape 11 to each other, under the existence of the laminar air flow 41. While, the negative pressure can also be generated by decreasing the running velocity of the magnetic tape 11, which can contribute to the control of magnetic spacing $d_{MS}$.

As described referring to FIGS. 4b to 4d, by controlling the amount of electric power supplied to the heating element 27, any pressure in a predetermined range from positive to negative can be applied between the tape head 10 and the magnetic tape 11. Here, the heating element acts as a valve or regulator for adjusting the air flow passing via the through hole 26, which can accordingly and dynamically control the total pressure, including the suppress force, working between the tape head 10 and the magnetic tape 11, according to the change of conditions such as the change over time. As a result, the magnetic spacing $d_{MS}$ can be stably controlled, and further, the excessive wear of the head can be avoided. In addition, the cross-sectional area of the through hole 26 can be quickly controlled by the heating element 27; therefore, responsive feedback controls of the above-described pressure can be performed by using the read output, as described in detail later.

FIGS. 5a to 5h show cross-sectional views schematically illustrating other embodiments of the thin-film magnetic head according to the present invention. FIGS. 5a, 5b, 5d and 5e indicate cross-sections taken along a plane corresponding to C shown in FIG. 1b, and FIGS. 5c, 5f, 5g and 5h indicate cross-sections taken along a plane corresponding to A shown in FIG. 1b.

Figure 5A:
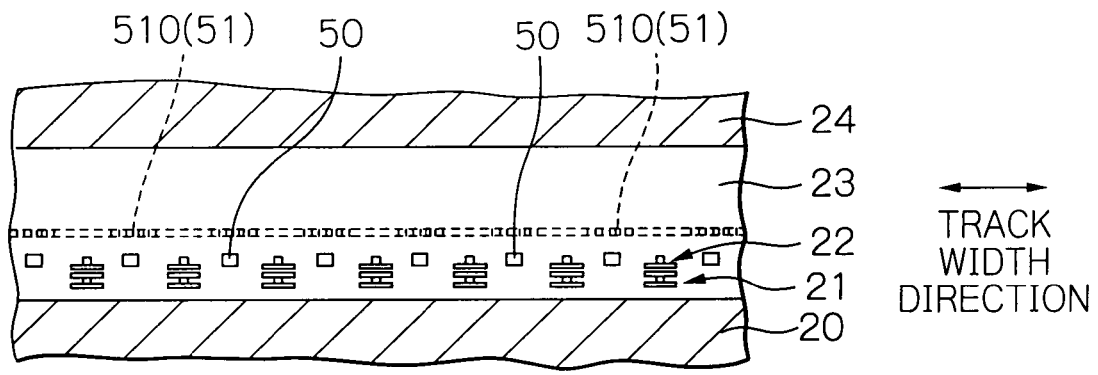
FIGS. 5a to 5h show cross-sectional views schematically illustrating other embodiments of the thin-film magnetic head according to the present invention.
Figure 5B:
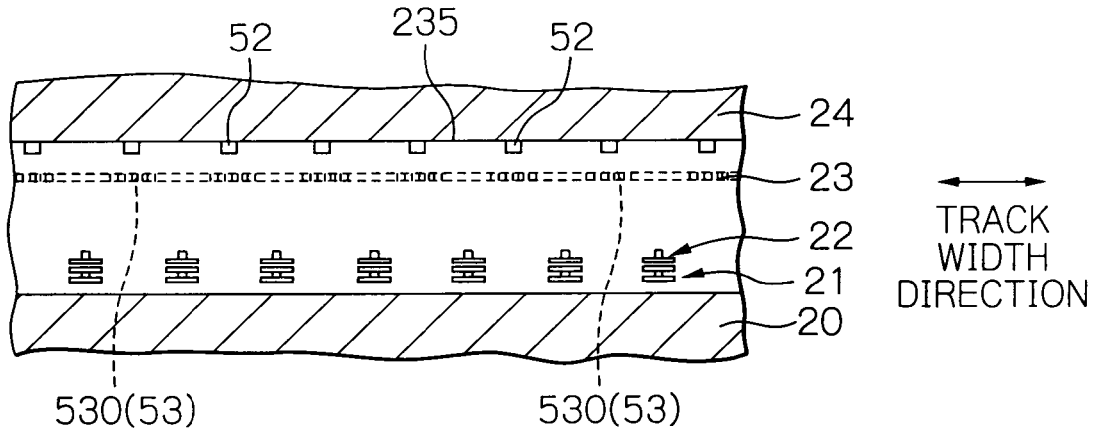

As shown in FIG. 5a, a plurality of through holes 50 is provided, not on the boundary of the closure 24 and the overcoat layer 23, but between the adjacent MR elements 21 (adjacent electromagnetic transducer 22) on the cross-section in the overcoat layer 23 of FIG. 5a. And heating portions 510 of a heating element 51 are provided directly above the through holes 50. Alternatively, the through holes 50 may be provided above the MR elements 21 and the electromagnetic transducer 22 in the overcoat layer 23, or may be provided on the boundary of the head substrate 20 and the overcoat layer 23. Further, the heating portions 510 may be provided directly below the through holes 50. While, as shown in FIG. 5b, a plurality of through holes 52 is provided on the boundary of the closure 24 and the overcoat layer 23, and specifically, are made of a plurality of grooves formed on the upper surface 235 of the overcoat layer 23. And the heating portions 530 of a heating element 53 are provided below the through holes 52.

In the case, the through holes 52 can be formed in the manufacturing process of the head, by forming these grooves on the upper surface 235 of the overcoat layer 23 in advance, and then bonding the closure 24 on the upper surface 235. Also in these embodiments, as described above, the pressure working between the tape head and the magnetic tape can be dynamically adjusted according to the change of conditions such as the change over time, by controlling the amount of electric power supplied to the heating element; thus, the magnetic spacing $d_{MS}$ can be controlled stably.

Figure 5C:
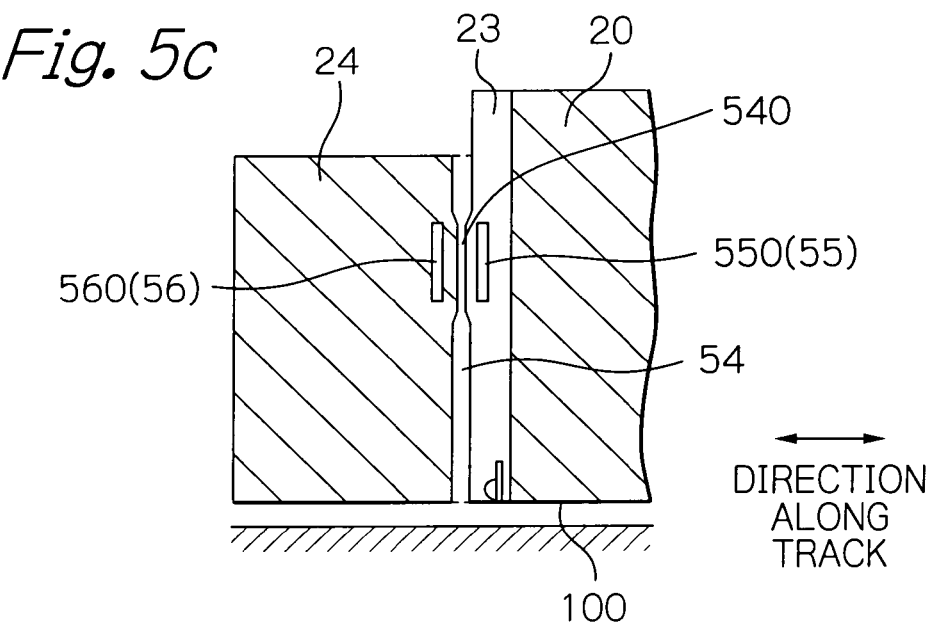

As shown in FIG. 5c, the heating portions 550 and the heating portions 560 of two heating elements 55 and 56 are provided in such a way as to sandwich a portion of through holes 54 in the above-and-below direction therebetween. When the heating elements 55 and 56 are supplied with electric power, the surrounding of the sandwiched portion 540 of the through hole 54 are thermally expanded by the heat generated from both of the heating portions 550 and 560. In this case, by adjusting the amounts of electric power supplied to the two heating elements 55 and 56, the cross-sectional area of the portion 540 of the through hole 54 can be controlled more surely and effectively. Here, alternatively, the two heating elements may be provided in such a way as to sandwich a portion of the through hole in the track width direction therebetween, or three or more heating elements may be provided in such a way as to surround a portion of the through holes. In any case, by controlling the amounts of electric power supplied to a plurality of heating elements, the pressure working between the tape head and the magnetic tape can be adjusted more surely and effectively.

Figure 5D:
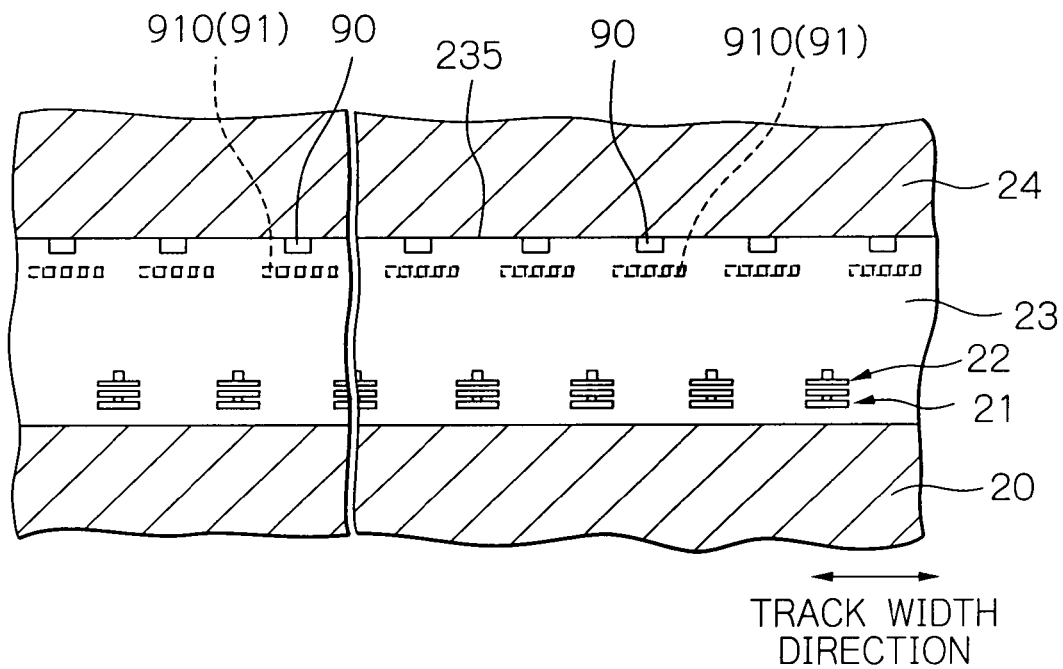

As shown in FIG. 5d, a plurality of through holes 90 is provided in the overcoat layer 23 and on the boundary of the closure 24 and the overcoat layer 23. Alternatively, the through holes 90 may be provided in the closure 24. The heating portions 910 of heating elements 91 are provided directly below the respective through holes 90. At both end portions of each of the heating portions 910, provided are lead portions that extend to the terminal electrodes, which enables the amount of heat generated from each of the heating portions 910 to be controlled independently. As a result, the balance in the track width direction of the pressure working between the tape head and the magnetic tape can be controlled, and further, the variation in characteristic of the MR elements 21 (electromagnetic transducers 22) can be suppressed by adjusting the degree of contact at each position of the elements.

Figure 5E:
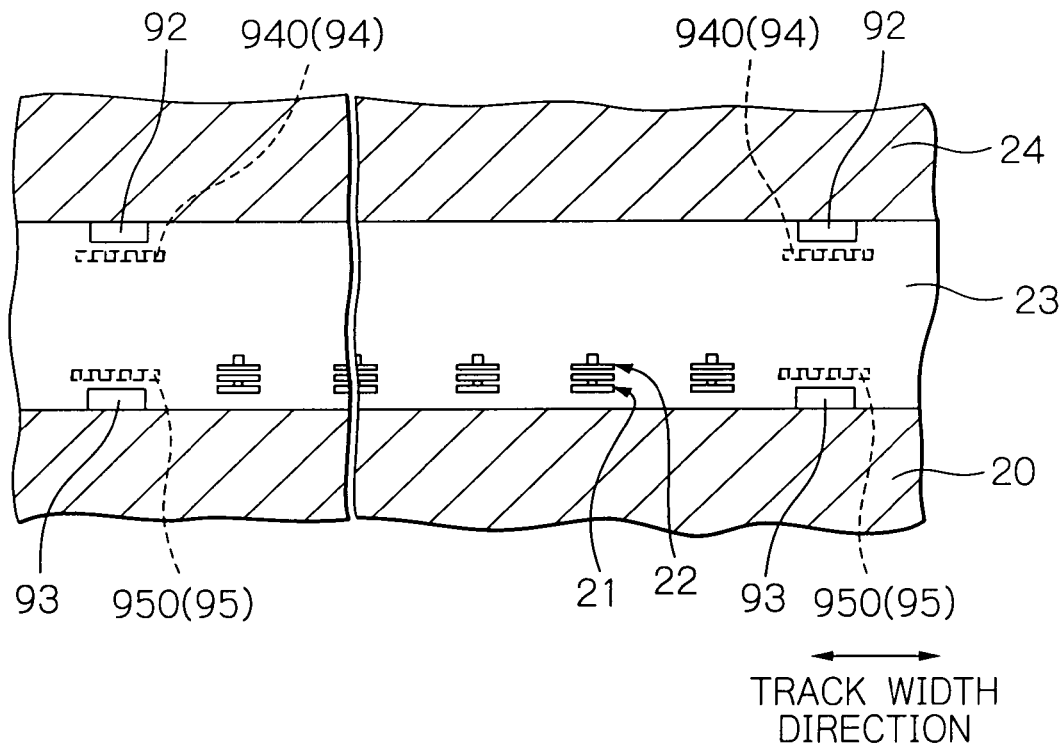

As shown in FIG. 5e, through holes 92 are provided in the overcoat layer 23 and on the boundary of the closure 24 and the overcoat layer 23. And, through holes 93 are provided in the overcoat layer 23 and on the boundary of the substrate 20 and the overcoat layer 23. Further, the heating portions 940 of heating elements 94 are provided directly below the respective through holes 92, and the heating portions 950 of heating elements 95 are provided directly above the respective through holes 93. At both end portions of each of the heating portions 940 and 950, provided are lead portions that extend to the terminal electrodes, which enables the amount of heat generated from each of the heating portions 940 and 950 to be controlled independently. As a result, the balance of the pressure working between the tape head and the magnetic tape can be controlled in the direction along track as well as in the track width direction.

Figure 5F:
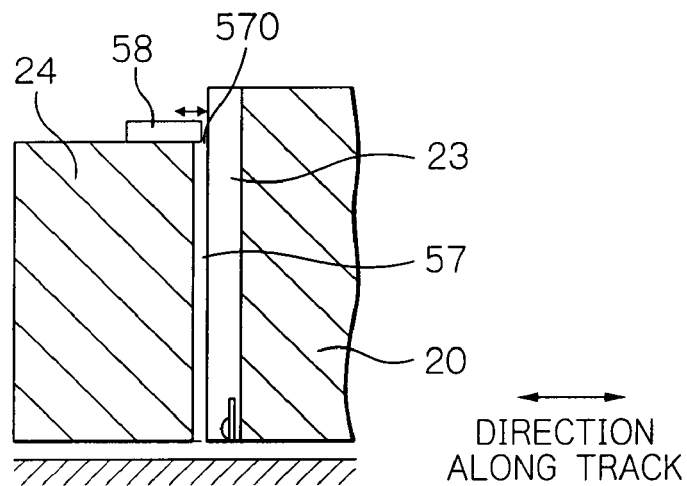

As shown in FIG. 5f, a piezoelectric element 58 is provided on the surface opposite to the TBS 100 of the closure 24 and the overcoat layer 23 and in the position around the opening 570 of the through hole 57. The piezoelectric element 58 is formed of, for example, a ferroelectric material such as lead zirconium titanate (PZT) with (inverse) piezoelectric effect, and is deformed by the application of voltage. The piezoelectric element 58 acts as a valve for opening and closing the opening 570 or for controlling the fluid resistance of the through hole 57, by utilizing the deformation. Also in this embodiment, the pressure working between the tape head and the magnetic tape can be dynamically adjusted according to the change of conditions such as the change over time, by controlling the amount of voltage applied to piezoelectric element 58; thus, the magnetic spacing $d_{MS}$ can be controlled stably.

Figure 5G:
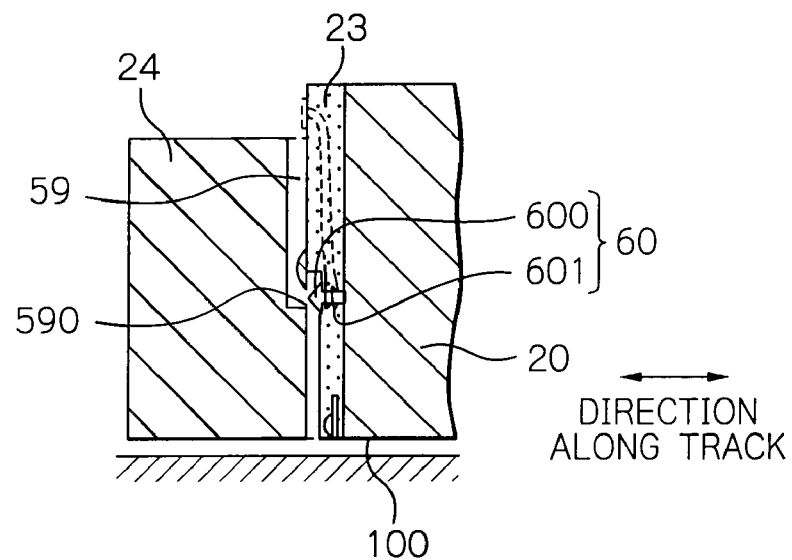

As shown in FIG. 5g, a through hole 59 consists of a groove part in the overcoat layer 23 and a groove part in the closure 24, both the groove parts being coupled with each other at the coupling end 590. Further, around the coupling end 590, a valve element 60 is provided for opening and closing the through hole 59 or for controlling the fluid resistance of the through hole 59. The valve element 60 has a valve part 600 and a heating part 601, and acts as a valve in the position of the coupling end 590. Specifically, the valve part 600 is thermally expanded to open and close the coupling end 590 or to control the fluid resistance in the position of the coupling end 590, due to the heat generated by supplying the heating part 601 with electric power. Alternatively, the valve element 60 may be formed of a piezoelectric element to act as a valve by the application of voltage to the element. Also in the above-described embodiment, the pressure working between the tape head and the magnetic tape can be dynamically adjusted according to the change of conditions such as the change over time, by controlling the amount of electric power supplied to the heating part 601; thus, the magnetic spacing $d_{MS}$ can be controlled stably.

Figure 5H:
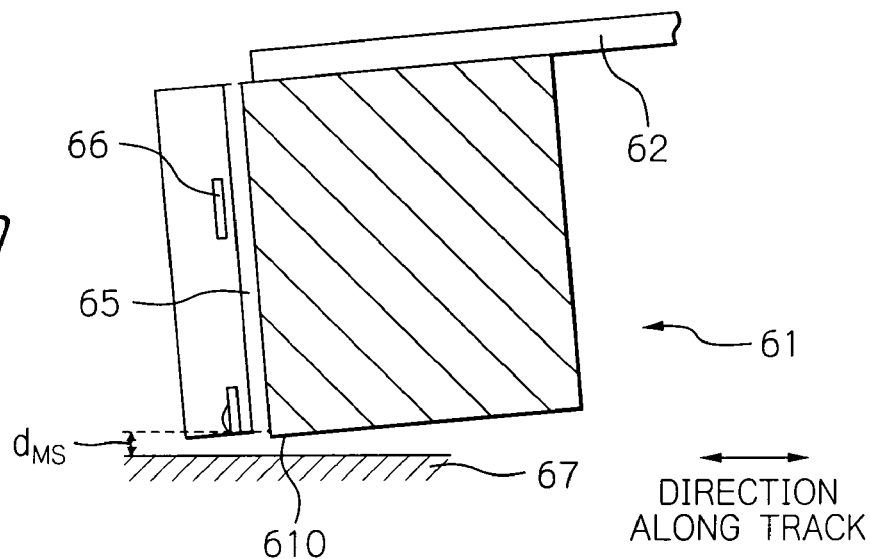

As shown in FIG. 5h, in a thin-film magnetic head 61 for magnetic disk apparatuses, provided are a through hole 65 and a heating element 66. The thin-film magnetic head 61 receives a certain negative pressure generated from the laminar air flow between the head 61 and the rotated magnetic disk 67. The thin-film magnetic head 61 flies to keep the magnetic spacing $d_{MS}$ at a predetermined value by balancing the negative pressure and the supporting force of suspension 62. However, the magnetic spacing $d_{MS}$ is varied by the change in shape of the air bearing surface (ABS) 610 due to the contact between the head 61 and the magnetic disk 67, or by the change of environment. As a countermeasure to this variation, by controlling the amount of electric power supplied to the heating element 66, any pressure derived from the through hole 65 in a predetermined range from positive to negative can be applied. As a result, the magnetic spacing $d_{MS}$ can be stably controlled as needed according to the change of conditions such as the change over time.

FIGS. 6a to 6c show perspective views schematically illustrating a further embodiment of the thin-film magnetic head according to the present invention, and FIG. 6d shows a schematic view explaining the operation of adjusting the pressure working between the head and the medium in this embodiment.

As shown in FIG. 6a, in this embodiment, the first head part 73 is formed by adhering an element substrate 70, a closure 71 and an added closure 72 together. The element substrate 70 includes a head substrate, MR elements and electromagnetic transducers formed on the element formation surface of the head substrate, and an overcoat layer covering the MR elements and the electromagnetic transducers. The closure 71 is adhered on the upper surface side of the overcoat layer, and the added closure 72 is adhered on the opposite side to the closure 71 of the element substrate 70. The closure 71 has a wide groove 710 and a transverse groove 711 on the surface to be adhered to the element substrate 70. The wide groove 710 constitutes a portion of a through hole (through-type slot) 730 (FIG. 6b) after the closure 71 is adhered to the element substrate 70. The transverse groove 711 constitutes a transverse hole portion of the through hole 730 after a frame 76 (FIG. 6b) is adhered. Further, The added closure 72 also has a wide groove 720 and a transverse groove 721 on the surface to be adhered to the element substrate 70. The wide groove 720 constitutes a portion of an added through hole 731 (FIG. 6b) after the added closure 72 is adhered to the element substrate 70. The transverse groove 721 constitutes a transverse hole portion of the added through hole 731 after a frame 76 (FIG. 6b) is adhered. Further, the second head part 74 (FIG. 6b) also has the same structure as the above-described first head part. Here, each of the through hole 730 and the through hole 731 has: a length in the track width direction of, for example, approximately 0.1 to 3000 μm; a length in the direction along track of, for example, approximately 0.1 to 3000 μm; and a length in the direction perpendicular to the TBS of, for example, 1 to 10 mm.

As shown in FIG. 6b, a tape head 77 includes: the first head part 73 and the second head part 74 which are formed as described above; a frame 76 adhered to the surfaces opposite to the TBS of these head parts; and a valve unit 75 provided so as to cover the openings of the transverse hole portions of the through holes 730, 731, 740 and 741, for controlling the amount of gas (air) flowing via the through holes 730, 731, 740 and 741. The structure and function of the valve unit 75 will be explained later by referring to FIG. 6d. Further, as shown in FIG. 6c, wiring members 78 are attached to the tape head 77. The wiring members 78 electrically connect the MR elements for reading data, the electromagnetic transducers for writing data, and the valve unit 75 as a flow-amount control means to the recording/reproducing and pressure control circuit 16 (FIG. 1a).

Here, the operation of adjusting the pressure working between the head and the medium in this embodiment will be explained by referring to FIG. 6d. FIG. 6d shows a cross-section covering the grooves 710 and 711 of the closure 71 and the valve unit 75. As shown in the figure, the valve unit 75 has a valve part 750 and a heating part 751, and acts as a valve at the position of the opening 730' of the through hole 730. Specifically, the valve part 750 is thermally expanded by the heat generated by supplying the heating part 751 with electric power through the wiring member 78 (FIG. 6c); and thus, the valve part 750 opens and closes the opening 730' or controls the fluid resistance at the position of the opening 730'. Alternatively, the valve unit 75 may be formed of a piezoelectric element, and may act as a valve when applying voltage to the piezoelectric element.

The valve unit 75 also has the same structure as described above at each position of: the opening of the transverse hole portion of the through hole 731; and two openings of the transverse hole portions of the through holes 740 and 741 of the second head part 74. Thus, the valve unit 75 opens and closes these openings or controls the fluid resistance at the positions of these openings. As a result, the valve unit 75 can independently control each of the amounts of gas (air) flowing via the four through holes 730, 731, 740 and 741. Therefore, the balance of distribution in the pressure working between the tape head 77 and the magnetic tape, especially in the direction along track, can be dynamically adjusted, and thus, the magnetic spacing $d_{MS}$ can be controlled more stably.

FIG. 7 shows a block diagram schematically illustrating a configuration of the recording/reproducing and pressure control circuit 16 (FIG. 1a) provided in the magnetic tape apparatus according to the present invention.

As shown in FIG. 7, the recording/reproducing and pressure control circuit 16 includes a head amplifier 80, a valve amplifier 81, a read/write (R/W) channel 82 connected to the head amplifier 80, a controller 83 connected to the R/W channel 82 and the valve amplifier 81, and an interface 84 connected to the controller 83.

The head amplifier 80, on the one hand, forms an read output signal by amplifying the read voltage outputted from the MR element 21, and then, sends the read output signal to the R/W channel 82; on the other hand, the head amplifier 80 forms an write current by amplifying the write input signal outputted from the R/W channel 82, and then, applies the write current to the electromagnetic transducer 22. The R/W channel 82, on the one hand, forms a data signal by code-demodulating the read output signal outputted from the head amplifier 80, and then, sends the data signal to the controller 83; on the other hand, the R/W channel 82 forms an write input signal by code-modulating the data signal outputted from the controller 83, and then, sends the write input signal to the head amplifier 80.

The controller 83, on the one hand, executes error correcting to the data signal outputted from the R/W channel 82, and then, sends the error-corrected data signal to an external host system through the interface 84; on the other hand, the controller 83 adds an error-correction code to the data signal received from the external host system through the interface 84, and then, sends the code-added data signal to the R/W channel 82.

Further, the controller 83 controls the amount of electric power for heating which the valve amplifier 81 outputs to the heating element 27, according to the read output signal sent from the head amplifier 80. In this case, the read output signal may be a data signal or a servo signal. Specifically, the controller 83 first measures the amplitude of the received read output signal, a peak width at half height of the signal, or the average value of them; and then, determines the magnetic spacing $d_{MS}$ at that time from the measurement result; and thus, estimates the degree of pressure working between the head and the medium. Next, the controller 83 sends a control signal to the valve amplifier 81 according to the estimate value so that the valve amplifier 81 provided the heating element 27 with heating electric power needed to correct the pressure for a desired one.

As described above, by using the recording/reproducing and pressure control circuit 16, the pressure working between the thin-film magnetic head and the magnetic recording medium can be dynamically controlled as needed according to the change of conditions such as the change over time. Further, the cross-sectional area of the through hole 26 can be quickly controlled by the heating element 27; therefore, responsive feedback controls of the pressure can be performed by using the read output.

Hereinafter, the effect of providing the through holes and the flow-amount control means will be explained by using a practical example in which read operations were performed with the thin-film magnetic head according to the present invention.

In the practical example, tape heads shown in FIGS. 6a to 6d were used to read data from a magnetic tape on which a predetermined record bit pattern is written. The read operations were performed in respective cases of: completely closing openings of the transverse hole portions in the through holes by the valve unit (close state); and fully opening the openings (open state). The used tape heads were of sixteen-channel type, that is, the heads had sixteen MR elements and sixteen electromagnetic transducers. The sixteen MR elements were AMR elements, and read data to provide read output which are an average value of output values of the sixteen MR elements. The penetration $d_P$, which is determined by the positions of the tape head and the guide pins, was 6.0 mm; and the magnetic tape was pressed to the tape head with suppress force of 75 kg-f (approximately 0.74 Newton). Each of the through holes between the element substrate and the closure and the added through holes between the element substrate and the added closure had: a length in the track width direction of 3.0 mm which is almost equivalent to the total width of the aligned sixteen MR elements (aligned sixteen electromagnetic transducers); a length in the direction along track of 0.1 μm; and thus an cross-sectional area of 300 μm². Further, the length of the through holes in the direction perpendicular to the TBS was 5 mm. The valve unit attached on the openings of the transverse hole portions in the through holes was of a type having heating parts as shown in FIG. 6d.

Figure 8A:
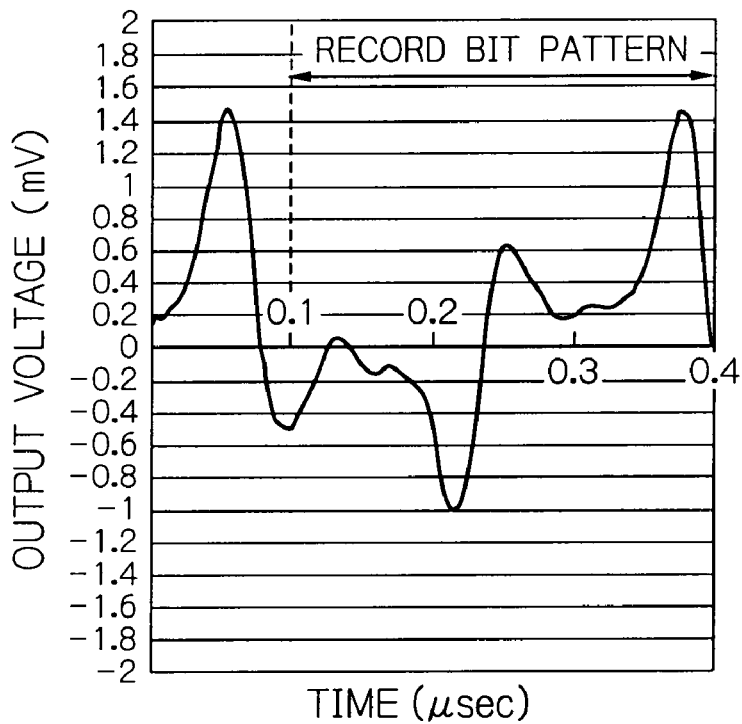
FIGS. 8a and 8b show graphs illustrating waveforms of read outputs in the practical example according to the present invention.
Figure 8B:
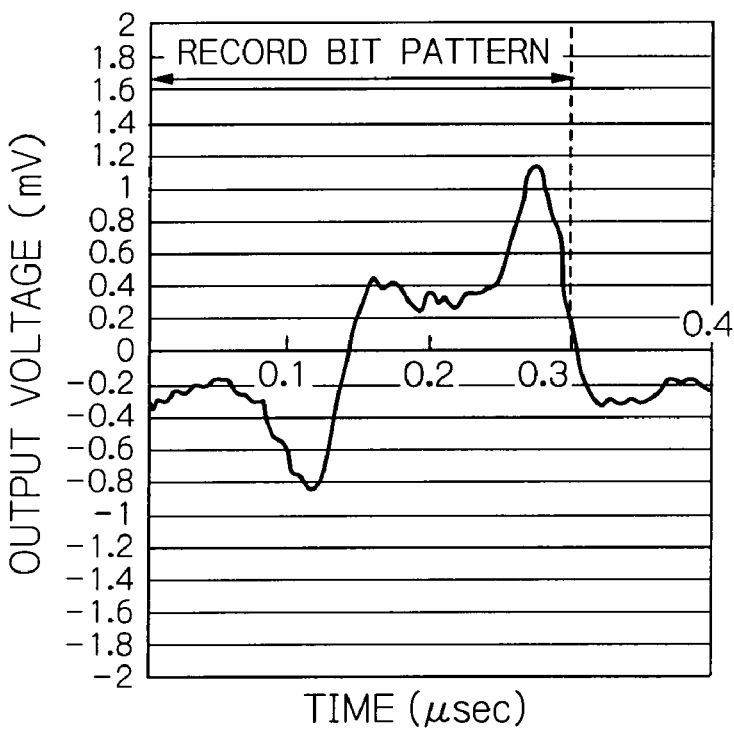

FIGS. 8a and 8b show graphs illustrating waveforms of read outputs in the practical example according to the present invention. Here, FIG. 8a presents a waveform of the read output corresponding to the predetermined record bit pattern in the case of completely closing the openings of the transverse hole portions in the through holes by the valve unit (close state). And FIG. 8b presents a waveform of the read output corresponding to the identical record bit pattern in the case of fully opening the openings by the valve unit (open state).

Further, Table 1 shows: read outputs $V_{PP}$ in the read output waveform; widths $PW50_{POSI}$ at half height of peaks on the positive side; and widths $PW50_{NEGA}$ at half height of peaks on the negative side, in the respective close and open states shown in FIGS. 8a and 8b. The read outputs $V_{PP}$ corresponds to the maximum value of the difference in voltage between the output peaks on the positive and negative sides. In the table, ns means "nanosecond".

TABLE 1

|  | Close state | Open state |
| --- | --- | --- |
| Read output $V_{PP}$ | 2.6 mV | 1.9 mV |
| Width $PW50_{POSI}$ at half height | 33 ns | 44 ns |
| Width $PW50_{NEGA}$ at half height | 42 ns | 47 ns |

As understood from FIGS. 8a and 8b and Table 1, in performing read operations to the identical record bit pattern, the read output $V_{PP}$ of the close state (FIG. 8a) is larger than that of the open state (FIG. 8b), while the widths $PW50_{POSI}$ and $PW50_{NEGA}$ at half height of the close state (FIG. 8a) are smaller than those of the open state (FIG. 8b). Generally, a width PW50 at half height becomes smaller as the magnetic spacing $d_{MS}$ decreases; that is, the width PW50 at half height corresponds to the magnetic spacing $d_{MS}$. Therefore, the magnetic spacing $d_{MS}$ can be controlled by setting the openings of the transverse hole portions in the through holes into the close or open states or by appropriately choosing an intermediate state, with the use of the valve unit. Further, as described above, the change in the magnetic spacing $d_{MS}$ is evidently derived from the variation in the pressure working between the thin-film magnetic head and the magnetic recording medium; thus, it is also understood that the pressure can be adjusted by using the valve unit and the through holes.

Furthermore, according to the above-described thin-film magnetic head of the present invention, a problem that the friction between the tape head and the magnetic tape is likely to increase significantly due to sticking at the start of the magnetic tape apparatus, can be dissolved, as well as controlling the magnetic spacing $d_{MS}$ dynamically and stably. This sticking between the head and the magnetic tape is likely to occur, especially in the case of leaving the apparatus not driven for a long time after backing up or restoring data. According to the thin-film magnetic head of the present invention, the friction at the start, which is larger than that during driving, can be reduced because the pressure working between the head and the magnetic tape can be adjusted.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head for reading data from a magnetic recording medium and/or writing data to a magnetic recording medium, comprising:
    at least one magnetic head element for reading and/or writing data, formed on/above an element formation surface of a substrate;
    an overcoat layer formed on said element formation surface so as to cover said at least one magnetic head element;
    a closure adhered to at least a portion of an upper surface of said overcoat layer; and
    at least one through hole reaching a surface opposed to said magnetic recording medium of said thin-film magnetic head, for adjusting a pressure working between said thin-film magnetic head and said magnetic recording medium,
    said at least one through hole reaching a sliding surface opposed to said magnetic recording medium of said thin-film magnetic head.

2. The thin-film magnetic head as claimed in claim 1, wherein said thin-film magnetic head further comprises at least one flow-amount control means for controlling the flow amount of gas that flows via said at least one through hole.

3. The thin-film magnetic head as claimed in claim 1, wherein said thin-film magnetic head further comprises at least one flow-amount control means for controlling the flow amount of gas that flows via said at least one through hole.

4. The thin-film magnetic head as claimed in claim 3, wherein said at least one flow-amount control means is at least one heating means.

5. The thin-film magnetic head as claimed in claim 4, wherein two heating means are provided in such a way as to sandwich the through hole therebetween.

6. The thin-film magnetic head as claimed in claim 3, wherein said at least one flow-amount control means is at least one piezoelectric element.

7. The thin-film magnetic head as claimed in claim 1, wherein said at least one through hole is provided on a boundary of said overcoat layer and said closure.

8. The thin-film magnetic head as claimed in claim 1, wherein an added closure is adhered on a surface opposite to the element formation surface of said substrate, and said at least one through hole is provided on a boundary of said added closure and said substrate.

9. A thin-film magnetic head for reading data from a magnetic recording medium and/or writing data to a magnetic recording medium, comprising:
    at least one magnetic head element for reading and/or writing data, formed on/above an element formation surface of a substrate;
    an overcoat layer formed on said element formation surface so as to cover said at least one magnetic head element;
    a closure adhered to at least a portion of an upper surface of said overcoat layer;
    an added closure adhered on a surface opposite to the element formation surface of said substrate;
    a frame adhered to surfaces opposite to a sliding surface of said substrate, said closure and said added closure;
    at least one through hole reaching a surface opposed to said magnetic recording medium of said thin-film magnetic head, for adjusting a pressure working between said thin-film magnetic head and said magnetic recording medium, said at least one through hole being provided on a boundary of said overcoat layer and said closure;
    at least one added through hole provided on a boundary of said added closure and said substrate; and
    at least one flow-amount control means for controlling the flow amount of gas that flows via said at least one through hole,
    said at least one flow-amount control means provided in positions of: an opening of said at least one through hole formed between said overcoat layer or said closure and said frame; and an opening of said at least one added through hole formed between said added closure or said substrate and said frame.

10. A magnetic tape apparatus comprising:
    at least one magnetic tape;
    at least two reels for feeding and/or winding said at least one magnetic tape;
    at least one thin-film magnetic head for reading data from said at least one magnetic tape and/or writing data to said at least one magnetic tape; and
    a recording and/or reproducing control circuit for controlling read and/or write operation performed by said at least one thin-film magnetic head,
    the thin-film magnetic head comprising:
        at least one magnetic head element for reading and/or writing data, formed on/above an element formation surface of a substrate;
        an overcoat layer formed on said element formation surface so as to cover said at least one magnetic head element;
        a closure adhered to at least a portion of an upper surface of said overcoat layer;
        at least one through hole reaching a sliding surface opposed to the magnetic tape of the thin-film magnetic head, for adjusting a pressure working between the thin-film magnetic head and the magnetic tape; and
        at least one flow-amount control means for controlling the flow amount of gas that flows via said at least one through hole, and
    said magnetic tape apparatus further comprising a pressure control circuit for controlling operations of said at least one flow-amount control means.

11. The magnetic tape apparatus as claimed in claim 10, wherein said at least one flow-amount control means is at least one heating means.

12. The magnetic tape apparatus as claimed in claim 11, wherein two heating means are provided in such a way as to sandwich the through hole therebetween.

13. The magnetic tape apparatus as claimed in claim 10, wherein said at least one flow-amount control means is at least one piezoelectric element.

14. The magnetic tape apparatus as claimed in claim 10, wherein said at least one through hole is provided on a boundary of said overcoat layer and said closure.

15. The magnetic tape apparatus as claimed in claim 10, wherein an added closure is adhered on a surface opposite to the element formation surface of said substrate, and said at least one through hole is provided on a boundary of said added closure and said substrate.

16. The magnetic tape apparatus as claimed in claim 10, wherein said thin-film magnetic head further comprises:
   an added closure adhered on a surface opposite to the element formation surface of said substrate;
   a frame adhered to surfaces opposite to a sliding surface of said substrate, said closure and said added closure; and
   at least one added through hole provided on a boundary of said added closure and said substrate,
   said at least one through hole being provided on a boundary of said overcoat layer and said closure, and
   said at least one flow-amount control means provided in positions of: an opening of said at least one through hole formed between said overcoat layer or said closure and said frame; and an opening of said at least one added through hole formed between said added closure or said substrate and said frame.

* * * * *